United States Patent
Poole

(10) Patent No.: US 7,764,407 B2
(45) Date of Patent: Jul. 27, 2010

(54) FLATBED IMAGE SYSTEM HAVING MAGNETICALLY LEVITATED CARRIAGE

(75) Inventor: David K. Poole, Boise, ID (US)

(73) Assignee: Marvell International Technology Ltd. (BM)

( * ) Notice: Subject to any disclaimer, the term of this patent is extended or adjusted under 35 U.S.C. 154(b) by 1388 days.

(21) Appl. No.: 11/199,869

(22) Filed: Aug. 8, 2005

(65) Prior Publication Data

US 2007/0028797 A1 Feb. 8, 2007

(51) Int. Cl.
*H04N 1/04* (2006.01)
*H04N 1/46* (2006.01)

(52) U.S. Cl. .................................. 358/474; 358/505

(58) Field of Classification Search .................. 358/474, 358/505, 1.1, 496, 497, 480, 486, 488, 490, 358/491, 494
See application file for complete search history.

(56) References Cited

U.S. PATENT DOCUMENTS

| | | | |
|---|---|---|---|
| 4,996,543 A * | 2/1991 | Moulin et al. | 396/562 |
| 6,810,297 B2 | 10/2004 | Adin et al. | |
| 6,871,597 B1 | 3/2005 | Hughes | |
| 6,875,452 B1 | 4/2005 | Evans et al. | |
| 6,885,536 B1 | 4/2005 | Kim | |
| 6,899,036 B2 | 5/2005 | Lamb et al. | |

* cited by examiner

*Primary Examiner*—Douglas Q Tran

(57) ABSTRACT

The present invention provides an image system comprising providing magnetic transport rails, spacing magnetic flux rails from the magnetic transport rails, positioning a position gradient strip adjacent to the magnetic transport rails and securing a magnetically levitated carriage assembly to the magnetic transport rails, wherein securing the magnetically levitated carriage comprises securing a linear scanning array and light source to scan images during movement of the magnetically levitated carriage, positioning a position detection tab over the position gradient strip to detect and provide position information and controlling the movement of the magnetically levitated carriage using a motivator tab.

20 Claims, 2 Drawing Sheets

US 7,764,407 B2

FLATBED IMAGE SYSTEM HAVING MAGNETICALLY LEVITATED CARRIAGE

BACKGROUND

The present invention relates generally to document image systems, and more particularly to a document scanner system having a magnetically levitated carriage.

Scanners for electronically forming an image of an original are known. Typically, the captured image provided by a scanner is a pixel data array that is stored in memory in a digital format. A distortion-free image requires a faithful mapping of the original image to the pixel data array. Scanners typically include at least one means for imposing a mechanical constraint during the image capture process in order to maximize the likelihood of faithful mapping.

The four types of scanners known in the art are drum scanners, flatbed scanners, two-dimensional array scanners and hand scanners. The focus of this invention is the flatbed scanner.

Flatbed scanners include a linear array sensor that is moved relative to the original along an axis that is perpendicular to the axis of the array. Thus, the position of the sensor in one dimension may be known by tracking the relative movement of the sensor. The position of the sensor in the perpendicular direction is implicitly fixed by addressing a particular array element at which intensity is to be measured.

In one embodiment of the flatbed scanner, the original is placed on a transparent platen and the sensor, along with an image illumination source, is placed on a side of the platen opposite to the original. As long as the original is not moved relative to the platen, the pixel data array will be fixed with respect to the image to be captured.

In another embodiment, the original is moved, rather than the sensor. This second embodiment is typical of facsimile machines. Precision paper transports provide a high degree of positional accuracy during the image-capture process.

Flatbed scanners use cables or straps to move the sensor carriage along rails that guide the carriage through the scan swath. This configuration can lead to maintenance and reliability issues in the long term. It is also subject to wide variations in scan results. If the carriage is not able to move in a smooth predictable fashion, the scan results will be of poor quality. The position information currently collected is an approximation collected by the motor "dragging" the scan carriage across the field of the platen. Any hesitation caused by cable fatigue or transport rail wear will result in degraded quality of the scan results.

Beneficial aspects of flatbed scanners include the ability to accommodate documents at least as large as A4, or 8.5"×11" paper. Moreover, some of these scanners can handle A1 paper in a single setup. However, the scanners are not generally portable, since they require a host computer for control, data storage and image manipulation.

Thus, a need still remains for a scanner carriage mechanism that is not subject to the wear and maintenance of today. In view of the popularity and business need to scan information for archival or transmission purposes, it is increasingly critical that answers be found to these problems.

Solutions to these problems have been long sought but prior developments have not taught or suggested any solutions and, thus, solutions to these problems have long eluded those skilled in the art.

DISCLOSURE OF THE INVENTION

The present invention provides an image system comprising providing magnetic transport rails, spacing magnetic flux rails from the magnetic transport rails, positioning a position gradient strip adjacent to the magnetic transport rails and securing a magnetically levitated carriage assembly to the magnetic transport rails, wherein securing the magnetically levitated carriage comprises securing a linear scanning array and light source to scan images during movement of the magnetically levitated carriage, positioning a position detection tab over the position gradient strip to detect and provide position information and controlling the movement of the magnetically levitated carriage using a motivator tab.

Certain embodiments of the invention have other aspects in addition to or in place of those mentioned or obvious from the above, which will become apparent to those skilled in the art from a reading of the following detailed description when taken with reference to the accompanying drawings.

BEST MODE FOR CARRYING OUT THE INVENTION

Figure 1:
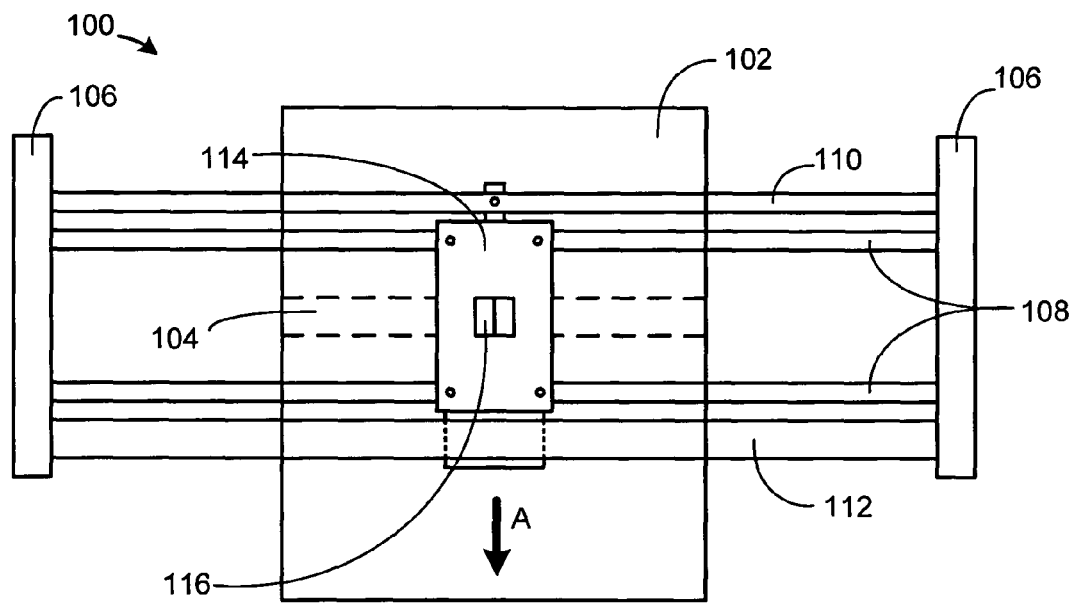
FIG. 1 is a view of a flatbed image system, such as a flatbed scanner system, having a magnetically levitated carriage, in an embodiment of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

Likewise, the drawings showing embodiments of the apparatus/device are semi-diagrammatic and not to scale and, particularly, some of the dimensions are for the clarity of presentation and are shown greatly exaggerated in the drawing FIGS. In addition, where multiple embodiments are disclosed and described having some features in common, for clarity and ease of illustration, description, and comprehension thereof, similar and like features one to another will ordinarily be described with like reference numerals.

The term "horizontal" as used herein is defined as a plane parallel to the conventional plane or surface of the scanner carriage, regardless of its orientation. The term "vertical" refers to a direction perpendicular to the horizontal as just defined. Terms, such as "on", "above", "below", "bottom", "top", "side" (as in "sidewall"), "higher", "lower", "upper", "over", and "under", are defined with respect to the horizontal plane.

Referring now to FIG. 1, therein is shown a view of a flatbed image system, such as a flatbed scanner system 100, having a magnetically levitated carriage 114, in an embodiment of the present invention. The flatbed scanner system 100 includes a paper path 102, with an arrow "A" indicating the direction of paper movement, a scan swath 104, support brackets 106, magnetic transport rails 108, a position gradient strip 110, magnetic flux rails 112, the magnetically levitated carriage 114 and a linear array scanner and light source 116. The paper path 102 indicates the plane that a subject document would travel during the scan process. The scan swath 104 is the segment of the paper path 102 that is covered by a scanning sweep. The support brackets 106 position the scan swath 104 relative to the paper path 102. The support brackets 106 spacing determines the maximum paper size that can move through the paper path 102.

The position gradient strip 110 supplies position data to move the magnetically levitated carriage 114 along the magnetic transport rails 108 during the scanning process. The accuracy of the position data has a direct impact on the quality of the scan result. The position gradient strip 110 is a plastic support beam with a magnetically coded Mylar™ strip on the top surface. Mylar™ is used as an example and other magnetically readable and writeable material can be used.

The magnetic flux rails 112 are a pair of iron base metal sheets that have strong magnets attached at both ends. The pair form a magnetic flux field that is used to move the magnetically levitated carriage 114. The magnetic flux rails 112 are spaced about 1 cm apart in this example. One of the rails form a north magnetic pole and the other rail forms a south magnetic pole. The magnetic flux density between the rails will determine the maximum speed capability of the magnetically levitated carriage 114. Securing the linear scanning array and light source on the magnetically levitated carriage 114 in a fixed position, wherein the motivator tab receives current from a controller in response to position information detected by the position detector tab as the magnetically levitated carriage moves through the scan swath 104. The magnetically levitated carriage 114 transports the linear array scanner and light source 116 above the paper path 102 as it glides above and along the magnetic rails 108.

Figure 2:
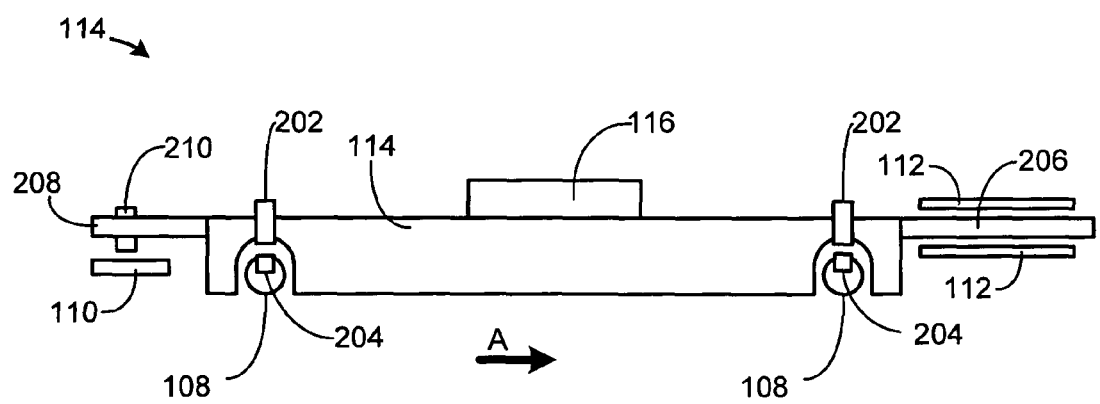
FIG. 2 is a cross-sectional view of the magnetically levitated carriage, as shown in FIG. 1.

Referring now to FIG. 2, therein is shown a cross-sectional view of the magnetically levitated carriage 114 as shown in FIG. 1. The cross-sectional view of the magnetically levitated carriage includes, the magnetic transport rails 108, the position gradient strip 110, the magnetic flux rails 112, the magnetically levitated carriage 114, the linear array scanner and light source 116, suspension magnets 202, fixed magnetic strips 204, a motivator tab 206, a position detection tab 208, and a magnetic detector 210. The structure of the magnetically levitated carriage 114 is molded plastic. The suspension magnets 202 are embedded in the carriage structure to align with the magnetic transport rails 108. The magnetic transport rails 108 comprise forming the fixed magnetic strips 204 embedded within the magnetic transport rails 108. The suspension magnets 202 embedded in the magnetically levitated carriage 114 further comprising aligning the suspension magnets 202 over the magnetic transport rails 108. Suspending the magnetically levitated carriage 114 further comprises compressing the flux field between like magnetic poles of the suspension magnets 202 and the magnetic transport rails 108. The repulsive magnetic force causes the magnetically levitated carriage 114 to be suspended over the magnetic transport rails 108.

The motivator tab 206 is a molded plastic extension of the magnetically levitated carriage 114. The motivator tab 206 includes a wire coil of sufficient turns to develop a magnetic field that contains approximately ½ of the flux density that exists between the magnetic flux rails 112. This configuration is commonly known as a voice coil motor.

A controller (not shown) manages the direction and amplitude of current flow, and therefore the magnetic orientation and field strength, the magnetically levitated carriage 114 will be motivated to move across the paper path 102 from right to left or from left to right. The controller (not shown) controls the movement of the magnetically levitated carriage 114 along the magnetic transport rails 108 using the suspension magnets 202 by providing current to a motivator tab 206. The controller (not shown) manages the current profile in the voice coil motor to control direction, velocity and acceleration, of the magnetically levitated carriage 114 along the magnetic transport rails 108.

Another key element to the scanning process is position detection. The position detection tab 208 is a molded extension of the magnetically levitated carriage 114. The position detection tab 208 holds the magnetic detector 210 that is aligned over the position gradient strip 110. The, magnetically coded, information on the position gradient strip 110 is sampled by the magnetic detector 210, as the magnetically levitated carriage 114 moves across the paper path 102. The position information is transferred to the controller (not shown), which uses the information to correlate the scan data and control the velocity of the magnetically levitated carriage 114. This allows highly accurate position information to be developed throughout the scanning process. Since high quality position information is continuously available, larger scan lengths will be possible and the speed of scanning can increase.

The magnetic detector 210 is a transducer or a magnetic read head that is capable of detecting magnetic transitions in the position gradient strip 110 media. The nature of the position detection tab 208 could be optical instead of magnetic. An optical detector and light source could be substituted for the magnetic detector with equally good results. Other embodiments of the position detector are also possible.

The present invention will have application in such image systems as printers, plotters, FAX machines and scanners. In multi-function devices that perform printing, scanning, FAX and copy, this flatbed scanner system having magnetically levitated carriage will enable quiet operation and reduced maintenance requirements. It could also enable wider devices for printing and scanning much larger paper sheets.

Figure 3:
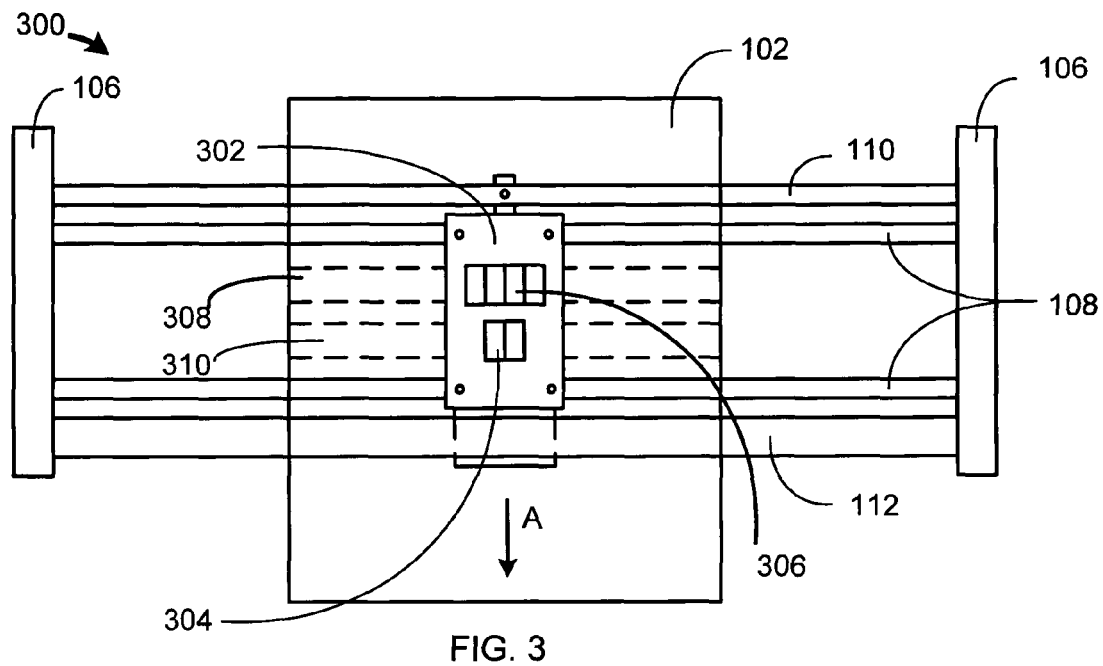
FIG. 3 is an alternative embodiment of the flatbed scanner system as shown in FIG. 1.

Referring now to FIG. 3 therein is shown an alternative embodiment 300 of the flatbed scanner system 100 as shown in FIG. 1. The alternative embodiment 300 of the flatbed scanner system 100 includes a magnetically levitated carriage 302, a linear array scanner and light source 304, an inkjet printer head 306, a printer swath 308 and a scan swath 310. The magnetically levitated carriage 302 carries both the linear array scanner and light source 304 and the inkjet printer head 306. The printer swath 308 is separated from the scan swath 310. This separation allows maintenance functions like cartridge alignment to be performed solely by the printer function. By using the scanner function for analysis, all adjustments can be performed in a single operation with no operator intervention.

It has been discovered that the flatbed scanner system 100 having the magnetically levitated carriage 114 can allow highly precise position information during the scan process. The accuracy of the position data will allow high quality image capture to be a by-product of a maintenance free transport mechanism. In an alternative embodiment of the flatbed scanner system 100, a highly intelligent printer can align cartridges and detect maintenance issues with ink supply or paper transport mechanisms.

Figure 4:
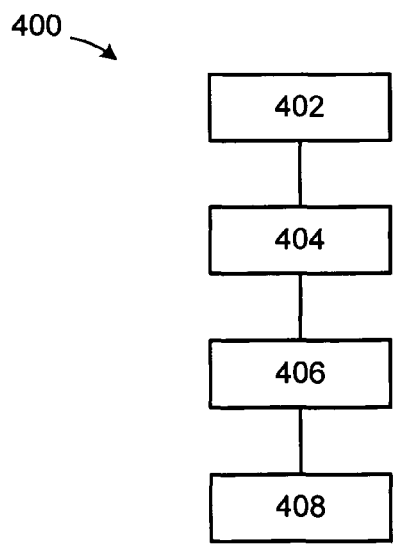
FIG. 4 is a flow chart of a flatbed scanner system having magnetically levitated carriage, in an embodiment of the present invention.

Referring now to FIG. 4, therein is shown a flow chart of a system 400 for a flatbed scanner system having magnetically levitated carriage in an embodiment of the present invention. The system 400 includes providing magnetic transport rails in a block 402; spacing magnetic flux rails from the magnetic transport rails a block 404; positioning a position gradient strip adjacent to the magnetic transport rails and securing a magnetically levitated carriage assembly to the magnetic transport rails in a block 406; and securing the magnetically levitated carriage comprises securing a linear scanning array and light source to scan images during movement of the magnetically levitated carriage, positioning a position detection tab over the position gradient strip to detect and provide position information and controlling the movement of the magnetically levitated carriage using a motivator tab in a block 408.

In greater detail, a flatbed scanner system having a magnetically levitated carriage, according to an embodiment of the present invention, is performed as follows:

1. Providing magnetic transport rails 108 mounted in support brackets 106 to establish the path of travel. (FIG. 1)
2. Spacing magnetic flux rails 112, from the magnetic transport rails 108, mounted in the support brackets 106, establish a constant flux field. (FIG. 1)
3. Positioning a position gradient strip 110, adjacent to the magnetic transport rails and securing a magnetically levitated carriage assembly to the magnetic transport rails, that supplies magnetically or optically coded position information. (FIG. 1)
4. Securing the magnetically levitated carriage 114 comprises securing a linear scanning array and light source 116 to scan images during movement of the magnetically levitated carriage 114, positioning a position detection tab 208 over the position gradient strip 110 to detect and provide position information and controlling the movement of the magnetically levitated carriage 114 using a motivator tab 206 that works with the magnetic flux rails 112 to develop directional force. (FIG. 1)

It has been discovered that the present invention thus has numerous beneficial aspects.

An aspect of the present invention is that the continuously available position information allows high quality scan data over a wider path.

Another beneficial aspect is that the magnetically levitated carriage does not contact the magnetic transport rails. This aspect reduces wear and the need for periodic cleaning or maintenance. There is also less noise associated with moving the magnetically levitated carriage across the scan swath.

Yet another important aspect of the present invention is that it valuably supports and services the historical trend of reducing costs, simplifying systems, and increasing performance.

These and other valuable aspects of the present invention consequently further the state of the technology to at least the next level.

Thus, it has been discovered that the flatbed scanner having magnetically levitated carriage method and apparatus of the present invention furnish important and heretofore unknown and unavailable solutions, capabilities, and functional aspects for scanning and printing. The resulting processes and configurations are straightforward, cost-effective, uncomplicated, highly versatile and effective, can be implemented by adapting known technologies, and are thus readily suited for efficiently and economically manufacturing scanning and printing devices that are fully compatible with conventional manufacturing processes and technologies.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the scope of the included claims. All matters hithertofore set forth herein or shown in the accompanying drawings are to be interpreted in an illustrative and non-limiting sense.

The invention claimed is:

1. A method comprising:
    moving a magnetically levitated carriage along magnetic transport rails;
    scanning an image using a linear scanning array and light source during the movement of the magnetically levitated carriage; and
    detecting magnetic transitions in a position gradient strip to provide position information of the magnetically levitated carriage.

2. The method of claim 1 wherein the magnetic transport rails include fixed magnetic strips.

3. The method of claim 1, further comprising:
    controlling the movement of the magnetically levitated carriage using a motivator tab positioned between magnetic flux rails, the magnetic flux rails spaced from the magnetic transport rails.

4. The method of claim 1 wherein detecting magnetic transitions in the position gradient strip comprises detecting magnetic transitions in the position gradient strip using a magnetic detector, a transducer or a magnetic read head.

5. The method of claim 1, further comprising:
    compressing a flux field between the magnetic transport rails and suspension magnets embedded in the magnetically levitated carriage.

6. An image system comprising:
    magnetic transport rails;
    magnetic flux rails adjacent to the magnetic transport rails;
    a position gradient strip adjacent to the magnetic transport rails; and
    a magnetically levitated carriage suspended over the magnetic transport rails, the magnetically levitated carriage having:
        suspension magnets within the magnetically levitated carriage;
        a motivator tab extended through the magnetic flux rails;
        a position detection tab extended over the position gradient strip;
        a linear scanning array and light source on the magnetically levitated carriage; and
        a current source connected to provide current to the motivator tab to move the magnetically levitated carriage along a scan swath.

7. The system as claimed in claim 6 wherein the magnetic transport rails comprise fixed magnetic strips embedded within the magnetic transport rails.

8. The system as claimed in claim 6 wherein the motivator tab comprises a wire coil embedded therein.

9. The system as claimed in claim 6 wherein the position detection tab comprises a magnetic detector, a transducer or a magnetic read head.

10. The system as claimed in claim 6 wherein the magnetic transport rails and the suspension magnets comprise like magnetic poles having a flux field therebetween configured to levitate the magnetically levitated carriage.

11. The system as claimed in claim 6 wherein the motivator tab includes a voice coil motor for moving the magnetically levitated carriage along the magnetic transport rails.

12. The system as claimed in claim 6 further comprising an optical position gradient strip located in a predetermined position relative to the magnetic transport rails, and wherein the position detection tab comprises an optical detector and light source to detect position information from the optical position gradient strip when the magnetically levitated carriage is moved along the magnetic transport rails.

13. The system as claimed in claim 11 wherein the magnetic flux rails are configured to form a constant density magnetic flux path for the voice coil motor.

14. The system as claimed in claim 6 wherein the position gradient strip comprises position information thereon coded magnetically or optically.

15. The system as claimed in claim 6 wherein the magnetically levitated carriage is located in a predetermined position relative to a paper path during movement of the magnetically levitated carriage.

16. An imaging system comprising:
 a magnetically levitated carriage suspended on magnetic transport rails;
 a scanning array and light source supported by the magnetically levitated carriage;
 a magnetic detector to provide position information of the magnetically levitated carriage; and
 a motivator tab including a wire coil to control movement of the magnetically levitated carriage along the magnetic transport rails.

17. The imaging system of claim 16, further comprising:
 a controller configured to receive the position information from the magnetic detector and correlate scan data with the position information.

18. The imaging system of claim 16, further comprising:
 a controller configured to adjust a magnetic field in the wire coil to change at least one of direction or velocity of the magnetically levitated carriage.

19. The imaging system of claim 16, wherein the magnetic detector reads magnetically coded information on a position gradient strip adjacent to the magnetic transport rails.

20. The imaging system of claim 16, further comprising:
 a memory for storing a captured image generated by the scanning array.

* * * * *